United States Patent Office 3,833,509
Patented Sept. 3, 1974

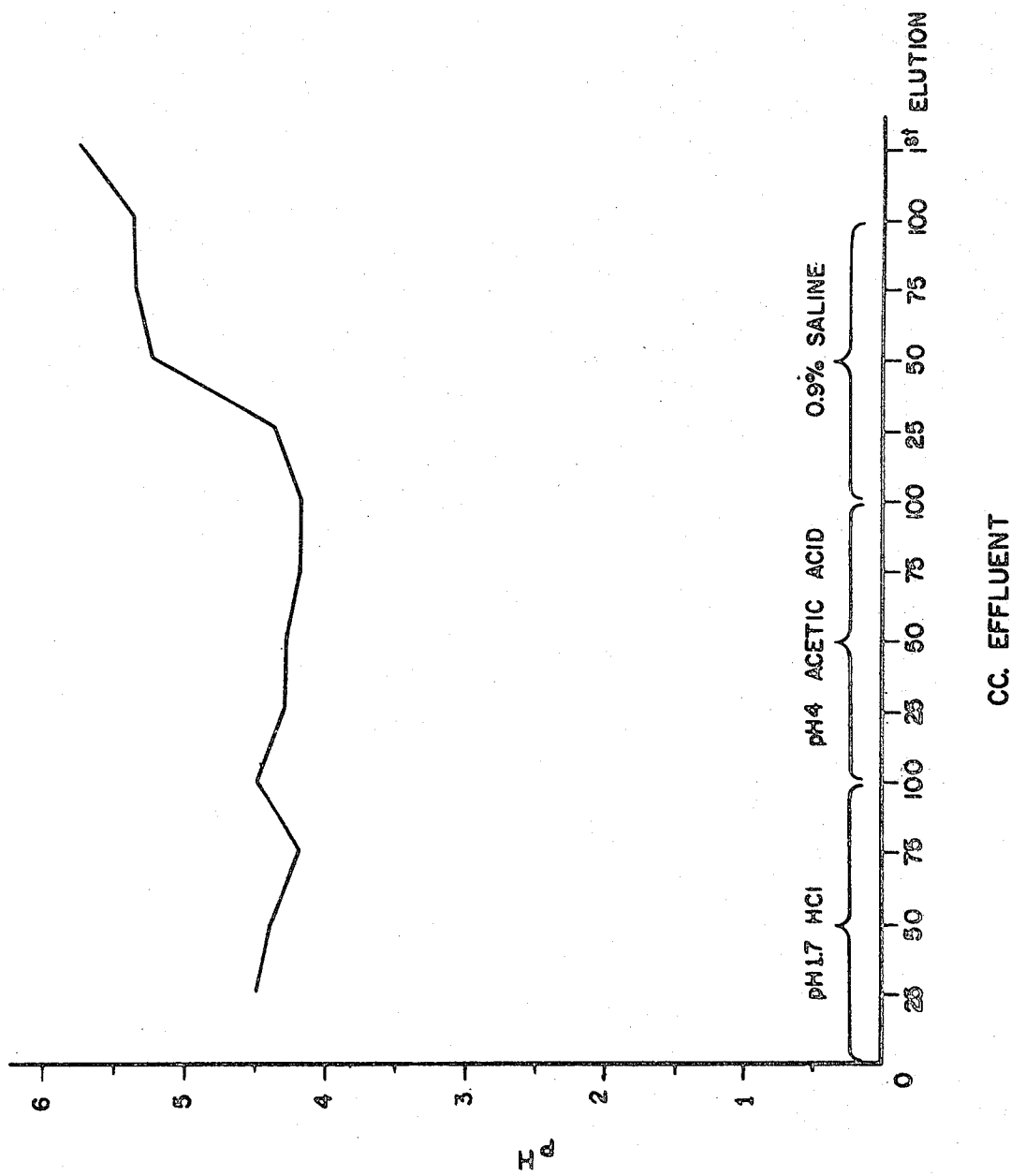

3,833,509
RADIONUCLIDE GENERATOR PRODUCTION METHOD
James L. Brown, House Springs, Mo., and Orval A. Harris, Collinsville, Ill., assignors to Mallinckrodt Chemical Works, St. Louis, Mo.
Filed Sept. 2, 1971, Ser. No. 177,269
Int. Cl. C09k 3/00
U.S. Cl. 252—301.1 R     16 Claims

ABSTRACT OF THE DISCLOSURE

Commercially important radionuclide generators utilize an alumina sorbent on which is adsorbed a parent radionuclide. The eluate from such generators contains significant quantities of aluminum ions in addition to the desired daughter radionuclide. Washing the alumina with an acetate fixing solution during the production of the generators substantially reduces the aluminum ion content of eluates obtained therefrom.

BACKGROUND OF THE INVENTION

This invention relates to the production of radionuclide generators, and more particularly to novel methods for manufacturing such generators which insure that the eluates obtained therefrom are of consistently high quality.

Because of its organ specificity and the minimal physiological risks associated with its short half-life, the radionuclide technetium-99m has gained an important place in the field of nuclear medicine. The most common diagnostic form of technetium-99m is as sodium pertechnetate in sterile, pyrogen-free physiological saline. To provide a sufficiently active amount of sodium pertechnetate for administration at the time and place of its use, it is usually obtained in the hospital by daily elution of a technetium generator. Such generators are described, for example, by M. W. Greene et al. (U.S. Pat. 2,942,-943), G. A. Bruno et al. (U.S. Pats. 3,369,121 and 3,440,-423), E. Lieberman et al. (U.S. Pat. 3,382,152), G. Ogier et al. (U.S. Pat. 3,446,965), D. J. Shumate (U.S. Pat. 3,535,085), and J. R. Montgomery et al. (U.S. application Ser. No. 779,793, filed Nov. 29, 1968 now U.S. Pat. 3,655,981). The generators described in these references each includes a chromatographic column having Mo-99 bearing molybdate ion adsorbed thereon. Radioactive decay of the relatively long-lived Mo-99 produces Tc-99m in the form of pertechnetate ions, Mo-99 being therefore referred to as the "parent" isotope and Tc-99m as the "daughter" isotope. Elution of the column with saline solution selectively desorbs the sodium pertechnetate, providing an on-the-spot source of this material.

The substrate commonly used in radionuclide generators for the chromatographic separation of Tc-99m from the parent Mo-99 is alumina. In preparing technetium generators, the practice is to activate the alumina column with a hydrochloric or nitric acid solution, of pH approximately 1.1, and then load the column. The column is loaded by adsorption from a solution containing radioactive molybdate ions, e.g., a solution of Mo-99 bearing sodium or ammonium molybdate, and sufficient HCl or $HNO_3$ to adjust the solution pH to approximately 3 to 5. After loading, the column receives a "fixing" wash of 0.1N HCl or $HNO_3$, followed by a final wash of physiological saline.

In the early days of technetium generator use, the practice was to elute the generator with a dilute (0.1·M) solution of HCl or $HNO_3$. As noted, the present practice is to use physiological saline solution as the eluting solution. Because of the acidic materials used in preparing, loading and washing or "fixing" the column, however, the column itself bears substantial residual acidity and the eluates from present day generators are commonly slightly acidic, approximately pH 3.5 to 5.0. The first eluate is the most acidic, successive elutions resulting in progressively higher pH values.

The use of acidic materials is essential in the preparation of technetium generators, since the parent Mo-99 can be adsorbed on alumina only under acidic conditions. For the same reasons, it is important to prevent the pH of the column system from exceeding 7 during elution. If the pH should rise much above 7, excessive amounts of Mo-99 are eluted along with the Tc-99m. The use of polyprotic acids and salts, e.g., sulfuric acid, phosphoric acid and the salts thereof, should also be avoided in processing Tc-99m generators since these materials also displace Mo-99 from alumina.

Under the acidic conditions utilized in processing the column, a small but significant amount of the alumina is dissolved, yielding aluminum ions which are subsequently carried out of the column on elution. Eluates from technetium generators have an aluminum ion content of as much as 100 micrograms per ml. or more. Since the generator eluate is usually administered either directly, or after further processing, by parenteral injection, aluminum ions in the eluate represent an undesirable contaminant and it is important that aluminum contamination be held to a low level. This is evidenced by the fact that the Atomic Energy Commission regulations define a maximum permissible level of aluminum in technetium generator eluates. The current limit of 0.50 mg. $Al^{+3}$/mc Tc-99m is an indication of what is considered to be medically acceptable and commercially achievable in the present state of the art.

The presence of aluminum ions constitutes a particular problem where the sodium pertechnetate eluate is further processed to a technetium-sulfur colloid. Introduced in 1964 by P. V. Harper et al. (J. Nuclear Medicine, 5:382), the technitium-sulfur colloid is especially useful for liver and spleen scanning. Presently, to prepare such a colloid the generator eluate (sodium pertechnetate solution) is mixed with a buffered thiosulfate solution under rigidly controlled conditions. This results in the precipitation of the "technetium-sulfur colloid" of predetermined particle size and other characteristics, which upon injection may be used in the scanning procedures. One determining factor in the success of such procedures is the particle size of the colloid. If the particle size of the colloid is too large or if aggregation of colloid particles occurs, unsatisfactory liver or spleen scans result. It is known that the presence of aluminum ions in the generator eluate at levels approaching the currently permissible maximum has a decidedly adverse effect on the particle size and aggregation properties of technetium-sulfur colloid preparations resulting from the use of such eluates in colloid preparation. With the increasing use of eluates for the extemporaneous preparation of other technetium-99m compounds, the aluminum ion content of the eluate becomes critical. In the case of technetium-sulfur colloid, the provision of eluates substantially free of aluminum ions is especially critical since an aluminum hydroxide precipitate may otherwise form at the relatively high (5 to 7) final pH of such preparations. For example, in a widely used method for preparing Tc-99m sulfur colloid, it has been found that as little as 1.6 μgm. of $Al^{+3}$ per ml. adversely affects the properties of the colloid.

Various approaches to avoiding or mitigating the aluminum problem have been proposed. For example, W. W. Hunter (J. Nuclear Medicine, 10, 607/1969) passed the generator eluate through a column of ion-exchange resin to remove the aluminum ion prior to using the eluate for preparation of technetium-sulfur colloids.

I. Ascanio et al. (German patent application 2,000,280/ 1970) and L. D. Samuels et al. (J. Nuclear Medicine, *11*, 182/1970) included the use of a chelating agent, ethylenediaminetetraacetic acid (EDTA), in procedures for preparing technetium-sulfur colloid. Chelation of the aluminum ions eliminates them as a source of trouble in preparing the colloids.

Both of the above methods are reasonably effective in overcoming the problems associated with the presence of aluminum ions in a sodium pertechnetate eluate. The Hunter method, however, requires an extra processing step which can represent a substantial inconvenience in the on-the-spot use of the eluate for diagnostic purposes. The Ascanio et al. method involves the incorporation of an additional foreign substance, EDTA, in a parenteral solution. Although the presence of EDTA is accepted in such solutions where necessary it has a chelating influence on calcium and may potentially adversely affect the blood.

A method which would substantially eliminate aluminum ions from parenteral pertechnetate solutions, without either the extra processing of Hunter or the EDTA addition of Ascanio et al. or Samuels et al., would therefore be highly desirable and represent an important advance in the art.

SUMMARY OF THE INVENTION

Among the several objects of the present invention, therefore, may be noted the provision of an improved method for preparing technetium-99m generators; the provision of such a method which substantially eliminates subsequent elution of aluminum ions from a technetium generator; the provision of such a method which does not require extra processing of the technetium-99m eluates; and the provision of a method which does not require the inclusion of a chelating agent or other foreign substance in the eluting solution. Other objects and features will be in part apparent and in part pointed out hereinafter.

Briefly, therefore, the present invention is directed to a method for producing a radionuclide generator. A column of chromatographic aluminum is prepared. The alumina is activated by contacting it with an activating solution containing a strong monoprotic mineral acid. A loading solution containing Mo-99 bearing molybdate ions is passed through the column, thereby adsorbing the molybdate ions on the alumina of the column. The column is then washed with an acetate fixing solution so that, on subsequent elution, the column yields an eluate containing pertechnetate ions and being substantially free of aluminum ions.

BRIEF DESCRIPTION OF THE DRAWINGS

FIG. 4 is a graph showing the effluent pH profile obtained in preparation of a Tc-99m generator in accordance with a preferred embodiment of the invention.

DESCRIPTION OF THE PREFERRED EMBODIMENTS

Figure 1:
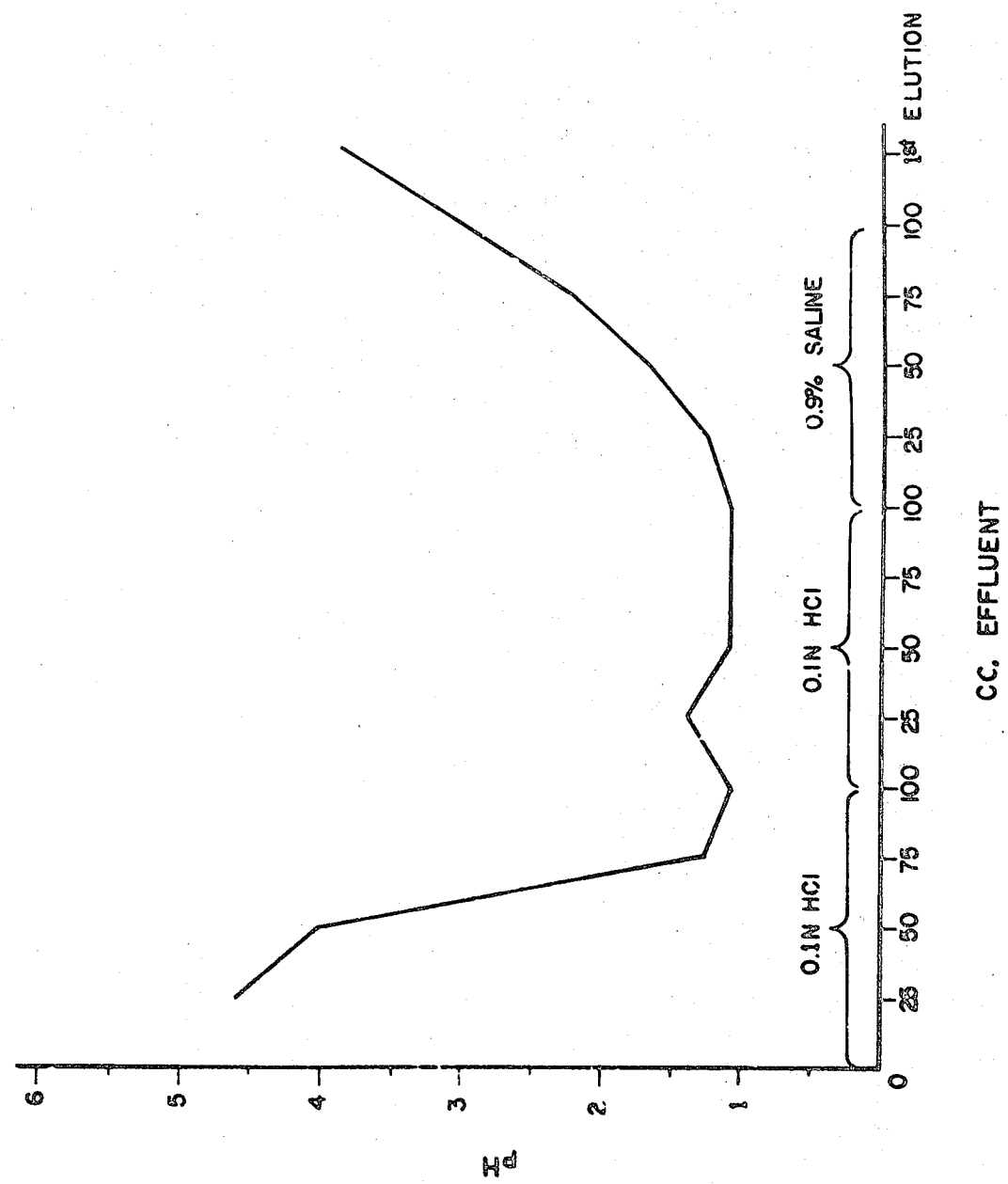
FIG. 1 is a graph showing the effluent pH profile during preparation of a Tc-99m generator by a conventional method.

In accordance with the present invention, it has now been found that through the use of an acetate fixing wash solution in place of the hydrochloric acid wash conventionally employed in the preparation of technetium-99m generators, the presence of aluminum ions is substantially eliminated from the sodium pertechnetate eluates obtained from the generators. Proper control of the pH of the acetate wash solution results in the production of a column whose elution provides a high yield of Tc-99m. Further, control of the pH of the activating solution prevents substantial breakthrough of molybdenum during the elution of the column. The eluates produced by columns prepared according to the invention are particularly suited for the production of technetium-sulfur colloids.

The particular acetate wash solution utilized for fixing the alumina column by the method of this invention should have a pH on the order of about 2.8 to about 6.0. This solution may simply be an acetic acid solution of appropriate concentration or a mixed solution of acetic acid and an acetate salt, for example, sodium acetate. In a preferred embodiment of the invention, a high yield of technetium-99m is obtained while maintaining the aluminum ion content of the eluate below 1.6 $\mu$g./ml. by using an acetate solution wash of pH about 4.0. For a conventional 30 ml. eluate from a 50 mc. generator, which typically contains about 130 mc. Tc-99m, this represents less than 0.00037 mg. $Al^{+3}$/mc. Tc-99m, compared to the AEC standard of 0.50. For larger generators which produce eluates of the same volume but with higher radioactive counts, even lower concentration of $Al^{+3}$/mc. of Tc-99m are found in eluates derived from generators produced by the method of this invention.

In a particularly preferred embodiment of the present invention, the alumina column is activated with a hydrochloric acid or nitric acid solution having a pH in the range of 1.6 to 1.7. A pH of 1.6 is particularly preferred for larger generators (e.g., 20 g. of alumina) and a pH of 1.7 is particularly preferred for smaller generators (e.g., 10 g. of alumina). Use of an activating solution of such character in conjunction with the acetate fixing washes of the type described yields a generator of optimum properties with respect to aluminum in the eluate, technetium-99m yield, and molybdenum breakthrough. Although the 1.6 to 1.7 pH range is preferred for the activator solution, it will be understood that conventional activator solutions (typically 0.1 normal HCl or $HNO_3$ whose pH is about 1.1) may be utilized as may activator solutions having a pH as high as about 2.0.

To prepare a generator in accordance with the invention, chromatographic alumina is first sifted, as for example on a No. 200 stainless steel screen, and the retained fraction backwashed with water until the supernatant liquid is clear. A slurry of the washed alumina is transfered into a conventional hollow glass generator column. Typically, for a standard 50 millicurie generator, the column is a 1" O.D. x 2" glass tube having a fritted glass disc fused to one end to provide a porous support for the alumina. Each end of the column is provided with a neckpiece adapted to be sealed with a standard rubber septum/crimped aluminum seal, such as is used in sealing conventional vials used in packaging injectable pharmaceutical solutions. The column is thus adapted to be sealed at each end by a pierceable, autoclavable closure. Sufficient alumina is transferred to this column to adsorb the intended loading of Mo-99. Conventionally, as much as 12 grams of alumina may be required for a 50 millicurie generator.

Optionally, the alumina may be overlaid with a layer of inert material such as silicic acid. Any empty space remaining in the column may be filled with glass wool, glass beads, or the like. After the column is loaded, the top and bottom openings are closed with pierceable rubber stoppers and sealed with aluminum closures.

Preparatory to loading the column, hollow inlet and outlet needles are forced through the top and bottom stoppers, respectively. The alumina is then activated by introducing an activating hydrochloric acid or nitric acid solution through the inlet needle and drawing it off through the outlet needle. After activation, further processing is preferably briefly suspended, and then a loading solution of sodium or ammonium molybdate containing the desired amount of Mo-99 is introduced through the inlet needle and the column is allowed to stand for a time sufficient for the adsorption process to take place. For optimum results, the molybdate solution should have a pH on the order of 3.5 ± 0.1.

After the column has stood for the time indicated, the acetic acid fixing solution is introduced through the inlet needle and drawn off through the outlet needle. Following this step, saline solution (e.g., 100–110 ml.), typically containing 0.9% sodium chloride, is passed through the column. Although not essential, the saline wash is preferred since it conditions the column for subsequent use in preparing parenteral solutions by displacing acid and washing out residual impurities. The inlet and outlet needles are then withdrawn or closed with suitable closures, and the loaded generator is autoclaved at 250° F. for about twenty minutes in accordance with conventional practice.

For the preparation of generators of various sizes (e.g., 50 and 100 mc.), approximately 100–110 ml. each of the activating solution and fixing solution are utilized. The amount of loading solution utilized is determined by the strength of the loading solution, its specific activity and the size of the generator. Typical loading solutions contain 15–50 mg. Mo/ml. and have specific molybdate activities of 0.2 to 0.75 curies/g. total Mo, with high concentrations normally being used where the specific molybdate activity is low. The column is allowed to drain for at least about 30 minutes after addition of the loading solution.

Technetium generators prepared in the above described manner consistently product eluates having a pH in the range of 4.5 or higher, substantially free of contaminating aluminum ions. The unique role of the acetate fixing wash in producing this result is not fully understood. The results obtained appear to be at least partly related to the maintenance of higher pH conditions during fixing and final washing of the column, but cannot be solely accounted for by this factor.

Figure 2:
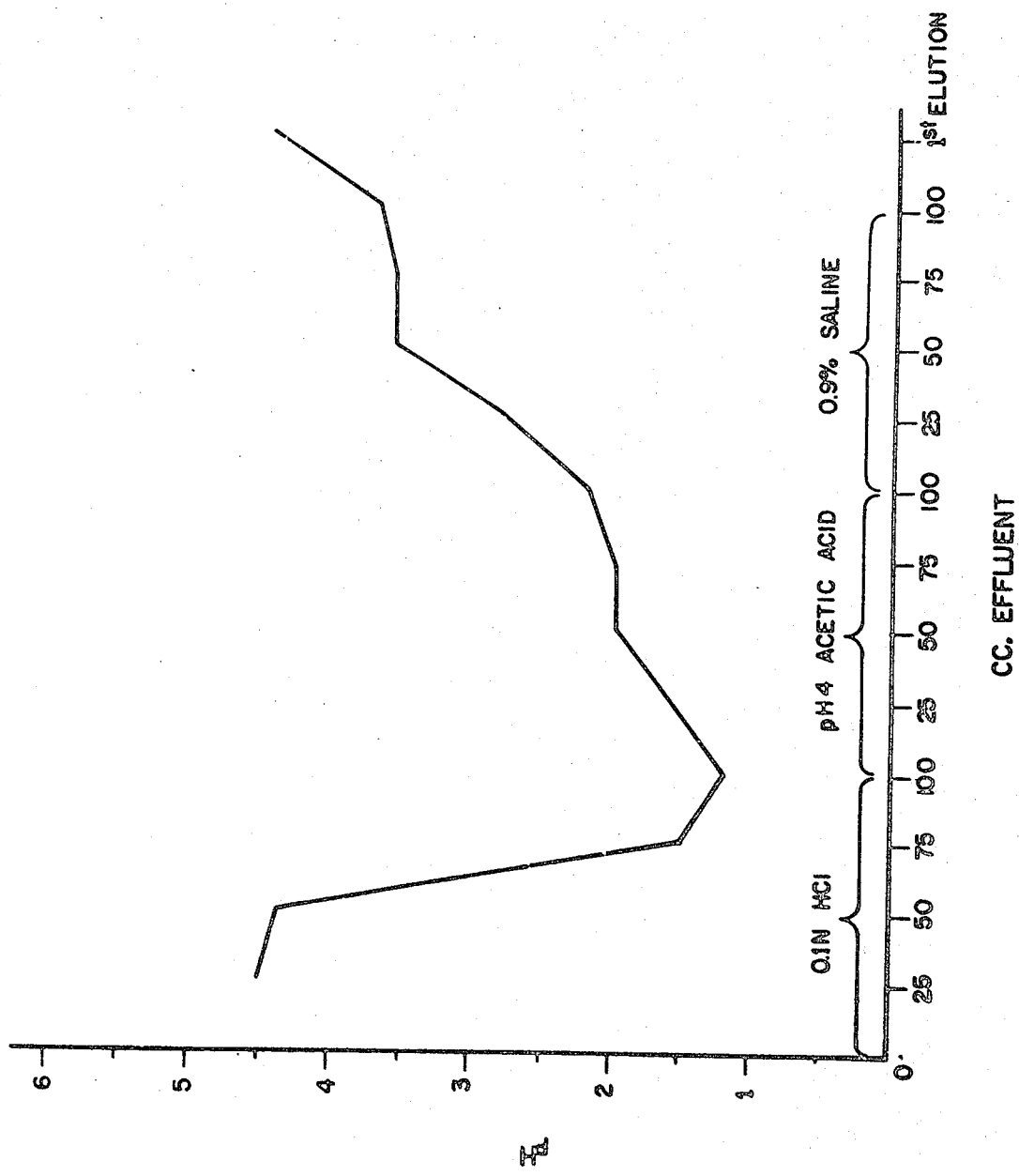
FIG. 2 is a graph showing the effluent pH profile obtained in preparation of a Tc-99m generator in accordance with one embodiment of the invention.

FIG. 1 shows the pH profile of the effluent obtained during the preparation of a generator under conventional practice and the pH of the first elution from such a generator. The relatively small volume of loading solution does not materially change the effluent pH between the end of activation and the beginning of fixing and is, therefore, not shown. The first elution has a pH of approximately 3.9 and contains a significant proportion of aluminum ion contamination. FIG. 2, by contrast shows the pH profile of the effluent and the pH of the first elution of a generator prepared using a pH 4 acetic acid solution for fixing. Since 0.1 N HCl is used for activation of this generator, the pH profile during activation is substantially the same as in FIG. 1, but the profile during fixation and saline wash is significantly higher. The first elution from this generator has a pH of 4.5. Thus, maintenance of higher pH conditions during the fixation step is one characteristic of the method of the invention.

Figure 3:
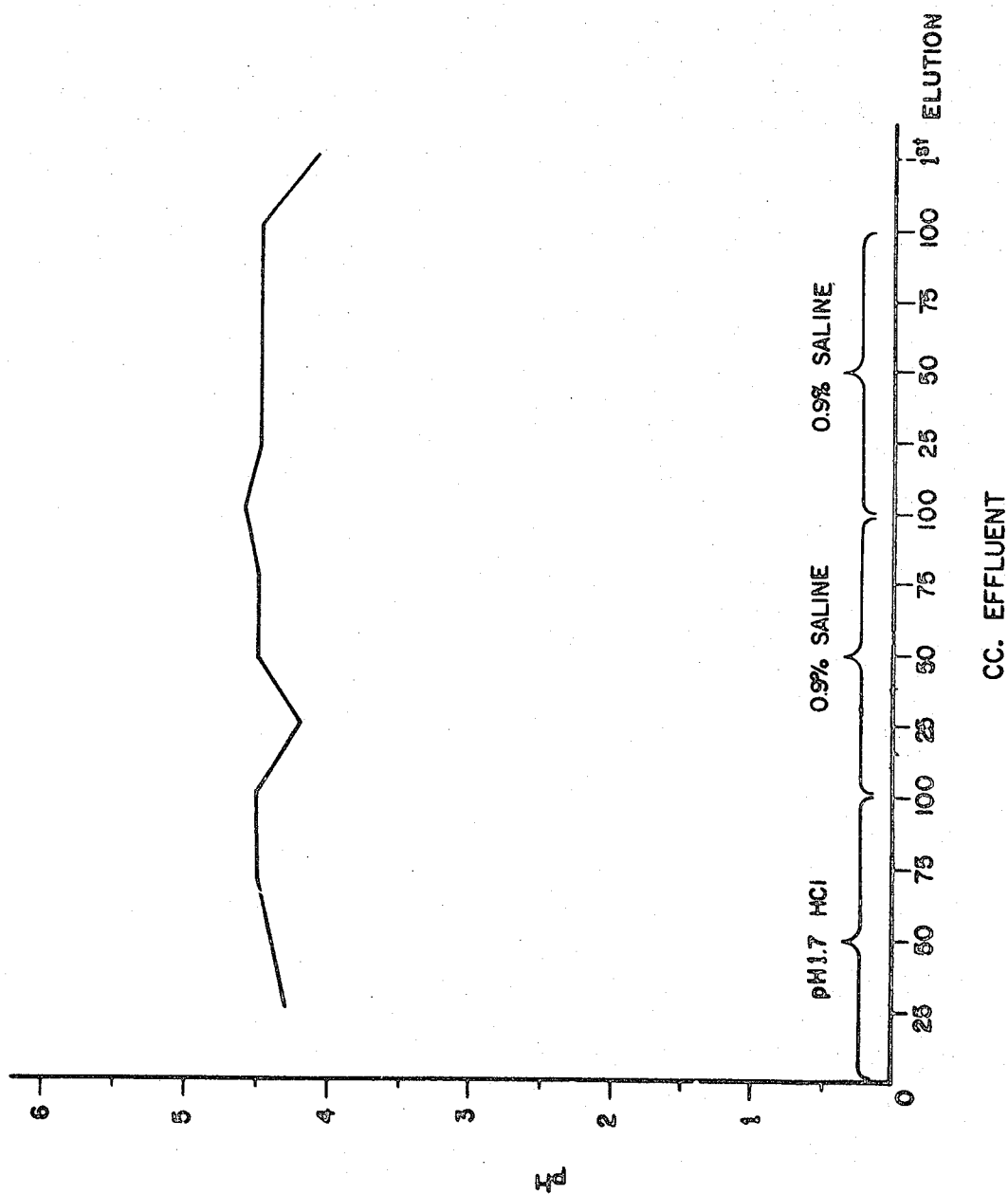
FIG. 3 is a graph showing the effluent pH profile obtained using successive saline washes following the activating wash in the preparation of a Tc-99m generator.

FIG. 3 demonstrates, however, that the maintenance of higher pH conditions during column preparation does not solely account for the higher pH of the first elution and the absence of substantial proportions of aluminum ions therefrom. In preparing the generator to which FIG. 3 relates, the preferred pH 1.7 HCl solution was used for activation, while a 0.9% saline solution was used both during the fixing wash and for the final wash. As shown, the pH of the effluent throughout the column preparation operations is higher than in FIG. 2. Nonetheless, the first elution has a pH of only 4.1 and contained an unsatisfactory proportion of aluminum ions, i.e., 26 µg./ml. Thus, the use of a saline wash does not consistently produce the desired aluminum ion concentration in the eluate.

FIG. 4 illustrates the characteristics of the effluent obtained during the preparation of a generator in accordance with the preferred method of the invention. It may be noted that the first elution has a pH of approximately 5.8. The aluminum ion concentration of the eluate was less than 1.6 µg./ml. If a signifcant concentration of aluminum ions were present, aluminum hydroxide would be precipitated at this pH. The following examples illustrate the invention.

Example 1

Six 100 millicurie technetium generators were prepared in the following manner.

The fines were removed from a quantity of Woelm chromatographic alumina by sifting the alumina on a No. 200 stainless steel screen and backwashing the retained fraction with water until the supernatant liquid was clear. A slurry of the washed alumina was transferred into each of six conventional glass generator columns. Each column was 1" O.D. x 2" and had a fritted glass disc fused to one end thereof. A neckpiece adapted to receive a standard rubber stopper was attached to both ends of each column. Approximately 22 grams of alumina, sufficient for loading of Mo-99 on a 100 millicurie generator was transferred to each column. A shallow layer of silicic acid was added above the alumina and the remaining empty space in each column was filled with glass wool which had previously been boiled in a 0.1% by weight hydrogen peroxide solution. Rubber stoppers, also previously boiled in 0.1% hydrogen peroxide were inserted in the neckpiece on each end of each column.

To prepare a solution of Mo-99 bearing sodium molybdate, metallic Mo-99 was first added to a flask containing 1 ml. of 5 N sodium hydroxide per gram of metal. The metal and sodium hydroxide solution were slowly slurried, and 30% hydrogen peroxide solution was slowly added thereto to oxidize the metal. Peroxide addition was continued until a clear yellow solution was obtained. 2.1 ml. of 42% by weight sodium hydroxide solution was then added for each gram of molybdenum metal processed, and this was followed with an additional 10 ml. of 30% hydrogen peroxide to insure complete oxidation. The resulting sodium molybdate solution was diluted with water to approximately half the final volume required and concentrated hydrochloric acid was added to adjust the pH to pH to 3.5+0.1. Immediately prior to use, the solution was diluted with water to 50 mg. Mo-99%ml. The activity of the molybdenum content of the solution was about 0.21 curie/g. total Mo.

Hollow inlet and outlet needles were forced through the top and bottom stoppers each of the generator columns which had been prepared. 100 ml. of a 0.1 N hydrochloric acid solution was added to the column through the inlet needle, allowed to percolate through the bed of alumina, and drained out through the outlet needle. After a brief delay, the columns were then loaded with Mo-99 using the sodium molybdate loading solution whose preparation is described above. After addition of the loading solution, each column was allowed to stand for a period of 30 minutes. To each column was then added 100 ml. of a 0.5% by weight acetic acid solution (pH 3.0) which was introduced through the inlet needle and drawn off through the outlet needle. This was followed by the addition of 100 ml. of 0.9% sodium chloride solution. The needles were then capped and the loaded generators were autoclaved at 250° F. for 20 minutes.

The six 100 millicurie columns thus prepared were subsequently eluted on five successive days with 30 ml. portions of 0.9% saline solution. The pH of the eluates obtained ranged from 5.0 to 5.3 and the aluminum ion content was less than 1.6µg./ml. A high yield of Tc-99m was obtained.

Examples 2-5

A number of additional alumina columns (both 50 and 100 mc.) were prepared in accordance with the method described in Example 1. These columns were activated and washed in accordance with the procedure described in Example 1, using the activating solutions and fixing wash solutions as indicated in Table 1. Mo-99 loading was accomplished in the manner described in Example 1 using the sodium molybdate solution there described.

Each of these columns was eluted on five successive days with 30 ml. of 0.9% saline solution. The pH and aluminum ion content of the eluates as well as the yields of Tc-99m are set forth in Table 1.

TABLE 1

| Example | No. of generators | Activating solution | Fixing solution | Eluate Aluminum ion concentrate (μg./ml.) | pH | Tc-99m, yield |
|---|---|---|---|---|---|---|
| 2 | 25, 50 mc. 24, 100 mc. | 0.1N HCl | 2.0% acetic acid, pH 2.8 | <1.6-5.0 | 4.8-5.4 | High. |
| 3 | 15, 100 mc. | 0.1N HCl | 2% sodium acetate/acetic acid, pH 5.8 | <1.6 | 5.1-5.2 | Low. |
| 4 | 15, 100 mc. | 0.1N HCl | 2% sodium acetate/acetic acid, pH 5.5 | <1.6 | 5.3 | Do. |
| 5 | 15, 100 mc. | 0.1N HCl | 2% sodium acetate/acetic acid, pH 6.0 | <1.6 | 5.6-5.7 | Do. |

Examples 6–14

To determine the optimum conditions for preparing a technetium generator in accordance with the invention, further experimentation was conducted testing variations of the pH of the activating solution and the fixing wash solution. Additional alumina columns were prepared in accordance with the method described in Example 1. These columns were loaded, activated and washed in accordance with the procedure described in Example 1, using the activating and fixing wash solutions as indicated in Table 2. Nonradioactive sodium molybdate solution was used in loading certain of the columns as indicated in Table 2, and for these columns, no Tc-99m yields are given.

Elution of the columns with 30 ml. portions of 0.9% saline solution produced eluates having the pH and aluminum ion concentrations indicated in Table 2.

TABLE 2

| Example | No. of generators | Activating solution | Fixing solution | Eluate Aluminum ion concentrate (μg./ml.) | pH | Tc-99m, yield |
|---|---|---|---|---|---|---|
| 6 | 5, 100 mc. | 0.1N, HCl | Acetic acid, pH 4.9 | <1.6 | 4.5-4.9 | High. |
| 7 | 10, 100 mc. | 0.1N, HCl | Acetic acid, pH 3.5 | Higher than Ex. 6 | 4.8-4.9 | Do. |
| 8 | 10, 100 mc. | 0.1N, HCl | Acetic acid pH 3.0 | Higher than Ex. 7 | 4.8-4.9 | Do. |
| 9 | 2 | HCl, pH. 1.5 | Acetic acid, pH 4.0 | High | 3.8-4.2 | |
| 10 | 6 | HCl, pH 1.8 | do | Low | 5.7-6.2 | |
| 11 | 2 | HCl, pH 2.0 | do | Low | 5.0-5.3 | |
| 12 | 1 | HCl, pH 3.0 | do | Low | 6.0-6.2 | |
| 13 | 330 | HCl, pH 1.7 (10 g. Al₂O₃) | Acetic acid | <1.6 | 5.2-6.3 | Do. |
| 14 | 329 | HCl, pH 1.6 (20 g. Al₂O₃) | Acetic acid, pH 4.0 | <1.6 | 5.4-6.7 | Do. |

*Excessive Mo-99 in eluate.

As the above data indicates, the optimum results, i.e., minimum aluminum ion content, are realized using a pH 4.0 acetic acid fixing wash solution in conjunction with a pH 1.7 HCl activating solution, when a small alumina column (10 g.) is being processed, or a pH 1.6 HCl activating wash where a larger alumina column (20 g.) is being processed. The use of these conditions provides a column which consistently produces eluates containing less than 1.6 micrograms per liter of aluminum ions. Eluates of this very low aluminum ion content are important for use in preparing technetium sulfur colloids. Because of the relatively high pH conditions under which the technetium sulfur colloids are prepared, higher concentrations of aluminum ions may result in the formation of precipitates.

It should be recognized that the above noted optimum conditions, while desirable in all cases, are essential only in the preparation of such radionuclides as technetium sulfur colloids. Results representing an improvement over prior art processes utilizing a chelating agent or extra processing steps can be realized by employing activating solutions having a pH of between about 1.1 and about 2.0 and acetate fixing wash solutions having a pH between about 2.8 and about 6.0.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A method for producing a radionuclide generator comprising the steps of:

placing chromatographic alumina in a hollow column having liquid-permeable means disposed inside said column for supporting said alumina;

activating said alumina by contacting it with a solution containing a strong monoprotic mineral acid:

passing a loading solution containing a Mo-99 bearing molybdate salt through said column, thereby adsorbing molybdate ions on the alumina of said column; and washing the column with an acetate fixing solution, thereby producing a column which on subsequent elution yields an eluate containing pertechnetate ions and being substantially free of aluminum ions.

2. A method as set forth in claim 1 wherein said column receives a saline solution wash following washing with said acetate fixing solution.

3. A method as set forth in claim 1 wherein said acetate fixing solution is acetic acid.

4. A method as set forth in claim 1 wherein said acetate fixing solution contains a mixture of acetic acid and an acetate salt.

5. A method as set forth in claim 1 wherein said acetate fixing solution has a pH of between about 2.8 and 6.0.

6. A method as set forth in claim 6 wherein said acetate solution has a pH of about 4.0.

7. A method as set forth in claim 1 wherein said mineral acid is selected from the group consisting of hydrochloric acid and nitric acid.

8. A method as set forth in claim 8 wherein said activating solution has a pH of between about 1.1 and about 2.0.

9. A method as set forth in claim 9 wherein said activating solution has a pH of between about 1.6 and about 1.7.

10. A method for producing a technetium-99m radionuclide generator comprising the steps of:

placing chromatographic alumina in a hollow column having liquid-permeable means disposed inside said column for supporting said alumina;

activating the column of alumina by passing an activating solution containing an acid selected from the group consisting of hydrochloric acid and nitric acid and having a pH of between about 1.6 and about 1.7 therethrough;

passing a loading solution containing a Mo-99 bearing salt selected from the group consisting of ammonium molybdate and sodium molybdate through said column, thereby adsorbing Mo-99 bearing molybdate ions on the alumina of said column;

washing the column with an acetic acid fixing solution having a pH of about 4.0; and washing the column with approximately 0.9% by weight saline solution, thereby producing a column which on subsequent elution yields an eluate containing pertechnetate ions and being substantially free of aluminum ions.

11. In a method for producing a radionuclide generator which comprises the steps of:

placing chromatographic alumina in a hollow column having liquid-permeable means disposed inside said column for supporting said alumina;

activating said alumina by contacting it with an activating solution containing a strong monoprotic mineral acid;

passing a solution containing a Mo-99 bearing molybdate salt through said column, thereby adsorbing molybdate ions on the alumina of said column; and washing the column with a fixing solution;

the improvement which comprises utilizing an acetate solution as the fixing solution, thereby producing a column which on subsequent elution yields an eluate containing pertechnetate ions and being substantially free of aluminum ions.

12. A method as set forth in claim 11 wherein said acetate fixing solution has a pH of between about 2.8 and 6.0.

13. A method as set forth in claim 12 wherein said acetate solution has a pH of about 4.0.

14. A method as set forth in claim 11, the column being activated with a hydrochloric acid solution having a pH of between about 1.6 and about 1.7.

15. A method as set forth in claim 11 wherein the column being activated with a nitric acid solution having a pH of between about 1.6 and about 1.7.

16. A radionuclide generator adapted for the preparation of technetium-99m eluates substantially free of aluminum ions comprising a bed of acetate-washed chromatographic alumina having Mo-99 bearing molybdate ions adsorbed thereon, a hollow column for containing said alumina and liquid permeable means disposed inside said column for supporting said alumina.

References Cited

UNITED STATES PATENTS

| | | | |
|---|---|---|---|
| 3,535,085 | 10/1970 | Shumate | 23—252 |
| 3,369,121 | 2/1968 | Bruno et al. | 250—106 |
| 3,382,152 | 5/1968 | Lieberman | 176—16 |
| 3,468,808 | 9/1969 | Arino | 252—301.1 |
| 3,436,354 | 4/1969 | Gemmill et al. | 252—301.1 |
| 3,446,965 | 5/1969 | Ogier et al. | 250—106 |

CARL D. QUARFORTH, Primary Examiner

R. L. TATE, Assistant Examiner

U.S. Cl. X.R.

23—252; 250—106 T

PO-1050
(5/69)

UNITED STATES PATENT OFFICE
CERTIFICATE OF CORRECTION

Patent No. 3,833,509        Dated September 3, 1974

Inventor(s) James L. Brown and Orval A. Harris

It is certified that error appears in the above-identified patent and that said Letters Patent are hereby corrected as shown below:

Column 1, in the heading, after "Brown" the address reading "House Springs, Mo." should read --Jefferson County, Mo.--. Column 5, line 33, "product" should read --produce--. Column 6, lines 42,43, "adjust the pH to pH to 3.5 + 0.1" should read -- adjust the pH to $3.5 \pm 0.1$ --. Columns 7 and 8, Table 2, Examples 11 and 12, there should be an asterisk after "low". Column 8, line 58, "claim 6" should read -- claim 5 --; line 63, "claim 8" should read -- claim 7 --; line 66, "claim 9" should read -- claim 8 --.

Signed and sealed this 12th day of November 1974.

(SEAL)
Attest:

McCOY M. GIBSON JR.         C. MARSHALL DANN
Attesting Officer           Commissioner of Patents